US005812827A

United States Patent [19]
McGrath

[11] Patent Number: 5,812,827

[45] Date of Patent: Sep. 22, 1998

[54] ENHANCED CARDBUS ADAPTER AND ASSOCIATED BUFFERING CIRCUITRY FOR INTERFACING MULTIPLE CARDBUS/16 BIT PC CARDS

[75] Inventor: H. John McGrath, Hillsboro, Oreg.

[73] Assignee: Intel Corporation, Santa Clara, Calif.

[21] Appl. No.: 812,913

[22] Filed: Mar. 10, 1997

Related U.S. Application Data

[63] Continuation of Ser. No. 380,048, Jan. 30, 1995, abandoned.

[51] Int. Cl.[6] .......................... G06F 13/00; G06F 15/177

[52] U.S. Cl. .......................... 395/500

[58] Field of Search .......................... 395/500, 309

[56] References Cited

U.S. PATENT DOCUMENTS

| | | | |
|---|---|---|---|
| 5,329,634 | 7/1994 | Thompson | 395/500 |
| 5,334,030 | 8/1994 | Brilliott | 439/75 |
| 5,373,467 | 12/1994 | Wang | 365/189.02 |
| 5,423,697 | 6/1995 | MacGregor | 439/638 |
| 5,505,633 | 4/1996 | Broadbent | 439/325 |
| 5,519,851 | 5/1996 | Bender et al. | 395/500 |
| 5,561,772 | 10/1996 | Dovnier et al. | 395/281 |

*Primary Examiner*—Kevin J. Teska
*Assistant Examiner*—Ayni Mohamed
*Attorney, Agent, or Firm*—Blakely, Sokoloff, Taylor & Zafman

[57] ABSTRACT

An otherwise conventional CardBus adapter is provided with an additional status register, a small number of additional pins, and associated external buffering circuitry. Furthermore, a number of the CardBus adapter's existing pins are either eliminated, redefined or used for multiple purposes. As a result, the CardBus adapter in conjunction with the associated external buffering circuitry is able to interface to multiple CardBus/16-bit PC Cards at the same time.

24 Claims, 9 Drawing Sheets

ENHANCED CARDBUS ADAPTER AND ASSOCIATED BUFFERING CIRCUITRY FOR INTERFACING MULTIPLE CARDBUS/16 BIT PC CARDS

This is a continuation of application Ser. No. 08/380,048, filed Jan. 30, 1995, now abandoned.

BACKGROUND OF THE INVENTION

1. Field of the Invention

The present invention relates to the field of computer systems, in particular, mobile computing systems. More specifically, the present invention relates to CardBus Adapters for interfacing CardBus/16-bit PC Cards.

2. Background Information

CardBus is Personal Computer Memory Card International Association's (PCMCIA) new 32-bit bus master interface. It uses a different protocol than the current 16-bit Release 2.1 interface. The differences between the two interfaces include both different signal definitions as well as different handshakes. Additionally, CardBus cards have low current drivers that make it difficult to bus multiple cards together. As a result, each CardBus adapter is constrained to interfacing with only one card, although it may be either a "new" CardBus PC Card or an "old" 16-bit PC Card. In other words, the card to adapter ratio is limited to 1:1.

FIG. 1 illustrates this prior art 1:1 approach 10 in further detail. CardBus/16bit PC Card 16 is coupled to CardBus adapter 12 via connector 14, on a 1:1 basis. CardBus adapter 12 comprises CCDO# and CCD1# pins 18 and STAT_CHANGED pin 20 for receiving card presence detection signals CCDO#/CD1 and CCD1#/CD2 19, and status signals CSTSCHG 21 from Card 16. CardBus adapter 12 also comprises REQ#, GNT#, CINT#, CSERR# and CAUDIO# pins 22 for exchanging transactional signals CREQ#/INPACK#, CGNT#/(WE/PGM#), CINT#/(RDY/BSY#), CSERR#/WAIT#, CAUDIO#/(BVD2/SPKR) 23 with Card 16. CardBus adapter 12 further comprises CADn/An, CADn/Dn, CC/BE/An/MS, and Target pins 24, and Parity and PERR# pins 26 for transferring address/data signals CAD[9–26]/A[–7,9,10–11, 17–18, 24–25] etc., CAD[O8, 27–31]/D[15:0], CC etc./A[8, 12, 15, 19,23] etc., CDEVSEL# etc./A[20–22] 25, and CPAR/A13 and CPERR#/A14 27 between itself and Card 16.

This prior art 1:1 approach is costly in terms of both ASICs and motherboard real estate, especially for mobile computing. Thus, it is desirable for a CardBus adapter to be able to interface to multiple CardBus/16-bit PC cards at the same time. As will be disclosed in more detail below, the enhanced CardBus adapter and the associated buffering circuitry of the present invention achieves these and other desired results.

SUMMARY OF THE INVENTION

The desired results are advantageously achieved by providing an otherwise conventional CardBus adapter with an additional status register, a small number of additional pins, and associated external buffering circuitry. Furthermore, a number of the CardBus adapter's existing pins are either eliminated[1], redefined or used for multiple purposes.

[1]Since in practice the CardBus adapter is typically implemented using ASICs with non-continuous pin increments, i.e. 160, 208 etc., the existing pins are freed up for other purposes rather than physically eliminated.

More specifically, the two conventional CCD pins are eliminated, and the conventional STAT_CHANGED pin is redefined for providing a consolidated STAT_CHANGED' signal, when set, denoting status change for one of the PCMCIA cards concurrently supported, including insertion of the PCMCIA card. One of the "eliminated" CCD pins in turn is used to provide a new detect and status change enable control signal for controlling the reading of the CCD (or CD) and CSTSCHG signals of the various PCMCIA cards. Multiple subgroups of the conventional CADn/An and CADn/Dn pins, three in each subgroup, are also used for the purpose of receiving the CCD (or CD) and CSTSCHG signals of the various PCMCIA cards. The received CCD (or CD) and CSTSCHG signals of the various PCMCIA cards are stored in the newly provided status register for the CardBus controlling software to read.

Additionally, multiple sets of the conventional REQ#, GNT#, CINT#, CSERR#, and CAUDIO# pins, one set for each of the PCMCIA cards, for facilitating the exchanges of transactional signals CREQ#/INPACK#, CGNT#/(WE/PGM#), CINT#/(RDY/BSY#), CSERR#/WAIT#, CAUDIO#/(BVD2/SPKR) with the various PCMCIA cards, and multiple pairs of new address/data control pins for providing new address/data control signals for controlling selective transfers of address/data signals CAD[9–26]/A[0–7, 9, 10–11, 17–18, 2425] etc., CAD[0–8, 27–31]/D[15:0], CC etc./A[8, 12, 15,19,23] etc., CDEVSEL# etc./A[20–22], CPAR/A13 and CPERR#/A14 between the CardBus adapter and the PCMCIA cards are provided.

The associated external buffering circuitry includes a PLD, a number of buffers, and preferably a number of drivers also. The PLD is used to provide the redefined STAT_CHANGED signal to the CardBus adapter responsive to the CCD (or CD) and CSTSCHG signals of the various PCMCIA cards. A first subset of the buffers is used to stage and provide the CCD (or CD) and CSTSCHG signals of the various PCMCIA cards to the CardBus adapter responsive to the new detect and status change enable control signal, whereas a second subset of buffers is used to stage and facilitate transfers of the aforementioned address/data signals between the CardBus adapter and the PCMCIA cards responsive to the new address/data control signals. The drivers are used to electrically isolate the various PCMCIA cards and facilitate exchanges of the aforementioned transactional signals between the CardBus adapter and the various PCMCIA cards. Drivers are used to electrically facilitate exchanges of transactional signals with the PCMCIA cards, thereby making it electrically feasible to couple the PCMCIA cards to the buffering circuitry by way of cables.

In one embodiment, buffers corresponding to each of the PCMCIA cards are employed for the provision of the CCD (or CD) and CSTSCHG signals and the transfer of address/data signals CAD[9–26]/A[0–7, 9, 10–11, 17–18, 24–25] etc., CAD[0–8, 27–31]/D[15:0], CC etc. /A[8,12,15,19,23] etc., CDEVSEL# etc. /A[20–22], and buffers common to all the PCMCIA cards are employed for the transfer of address/data signals CPAR/A13 and CPERR#/A14.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
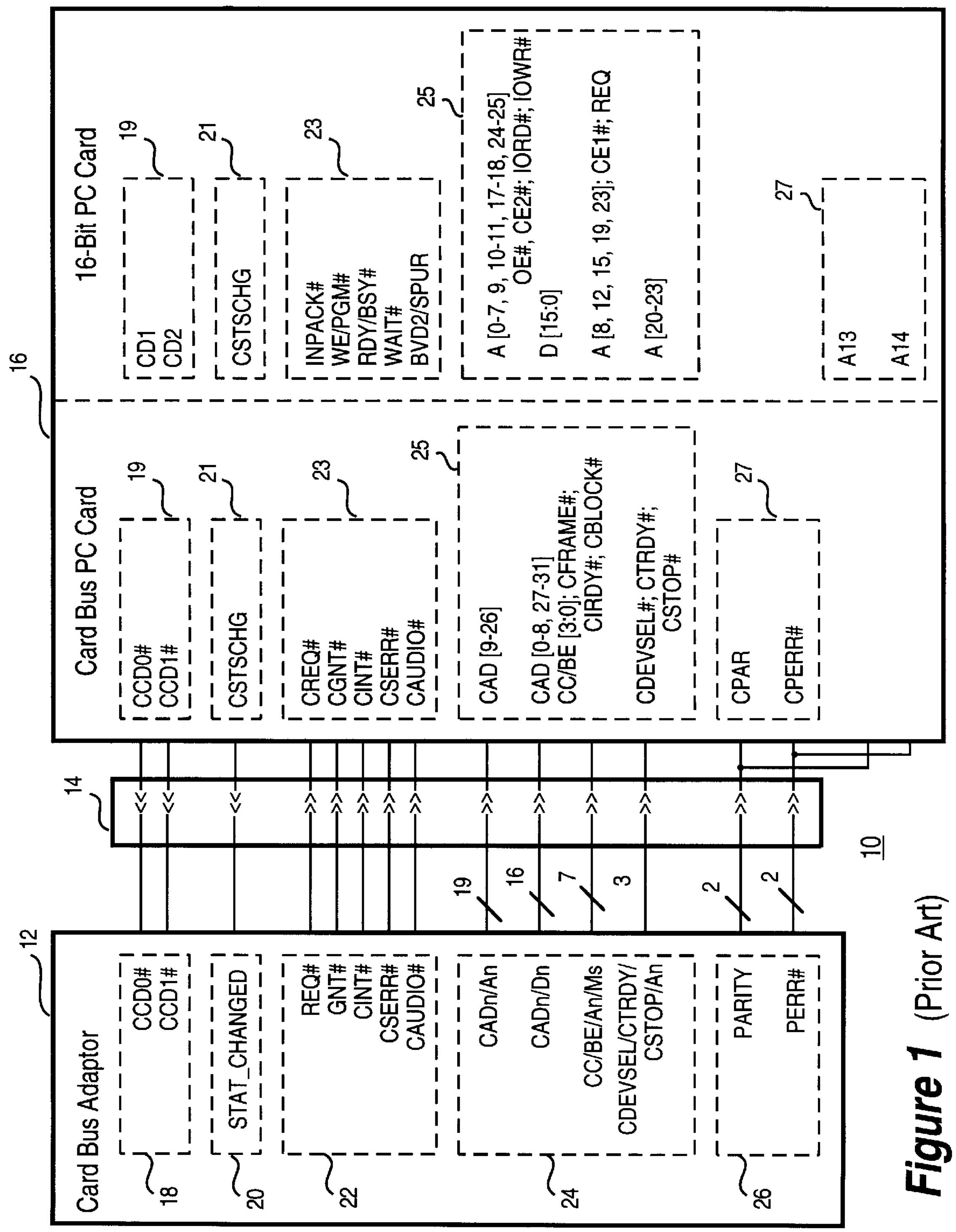
FIG. 1 illustrates the prior art 1:1 approach.

Referring again briefly to FIG. 1, for ease of explanation, card presence detection signals CCDO#/CD1 and CCD1#/CD2 19 hereinafter will be referred to as Signal Group A or SGA, and CCDO# and CCD1# pins 18 hereinafter will be referred to as SGA pins. Status changed signal CSTSCHG hereinafter will be referred as SC. Transactional signals CREQ#/INPACK#, CGNT#/(WE/PGM#), CINT#/(RDY/BSY#), CSERR#/WAIT#, CAUDIO#/(BVD2/SPKR) 23 hereinafter will be referred to as Signal Group B or SGB, and REQ#, GNT#, CINT#, CSERR# and CAUDIO# pins 22 will be referred to as SGB pins. Address/data signals CAD [9–26]/A[0–7, 9, 10–11, 17–18, 24–25] etc., CAD[0–8, 27–31]/D[15:0], CC etc./A[8,12,15,19,23] etc., CDEVSEL# etc./A[20–22] 25, and CPAR/A13 and CPERR#/A14 27 hereinafter will be referred to as Signal Groups C and D or SGC and SGD respectively, and CADn/An, CADn/Dn, CC/BE/An/MS, and Target pins 24 and Parity and PERR# pins 26 hereinafter will be referred to as SGC and SGD pins respectively.

Figure 2:
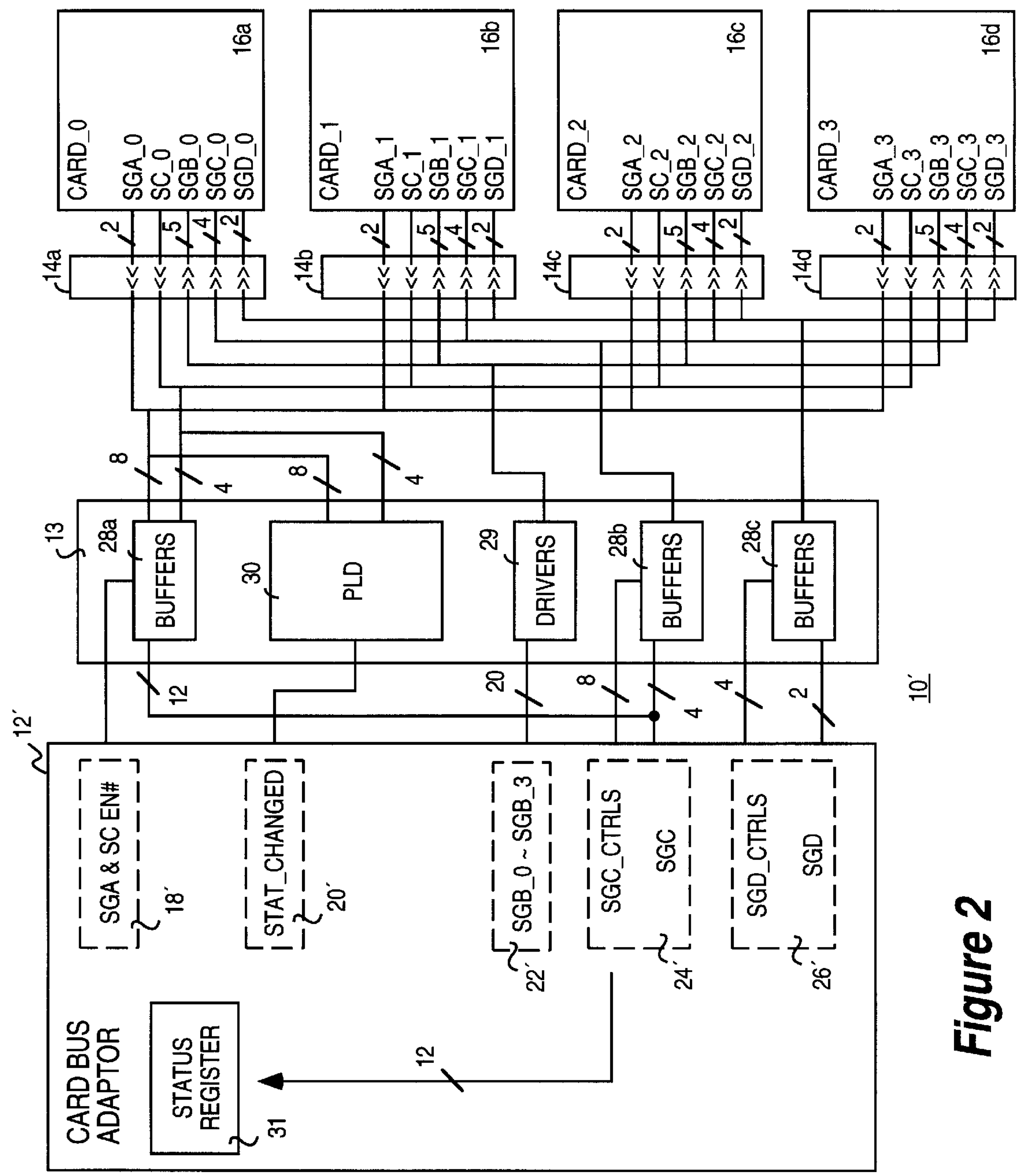
FIG. 2 illustrates a 1:4 embodiment of the CardBus adapter and associated external buffering circuitry of the present invention for concurrently interfacing to multiple CardBus/16-bit PC Cards.

Referring now to FIG. 2, a high level view of an 1:4 embodiment 10' of the enhanced CardBus adapter 12' and related buffering circuitry 13 for concurrently interfacing to multiple CardBus/16-bit PC Cards 16*a*–16*d* is shown. As illustrated, CardBus/16-bit PC Cards 16*a*–16*d* are coupled to CardBus adapter 12' through conventional connectors 14*a*–14*d* and external buffering circuitry 13 of the present invention. In addition to external buffering circuitry 13, CardBus adapter 12' is further provided with an additional status register 31 and a small number of additional pins to pin groups 18', 22', 24' and 26'. Furthermore, a number of CardBus adapter's existing pins in pin groups 18', 20' and 24' are either eliminated, redefined or used for multiple purposes.

More specifically, the two conventional CCD pins 18 are eliminated, and the conventional STAT_CHANGED pin 20 is redefined for providing a STAT_CHANGED' signal, when set, denoting status change for one of the PCMCIA cards 16*a*–16*d* concurrently supported, including insertion of the PCMCIA card 16*a*–16*d*. One of the eliminated CCD pins 18' in turn is used to provide a new detect and status change enable control signal (SGA & SC EN#) for controlling the reading of SGA_0–SGA_3 and SC_0–SC_3 of PCMCIA cards 16*a*–16*d*. Multiple subgroups of SDC pins 24', three in each subgroup, are also used for the purpose of receiving SGA_0–SGA_3 and SC_0–SC_3 of PCMCIA cards 16*a*–16*d*. The received SGA_0–SGA_3 and SC_0–SC_3 of PCMCIA cards 16*a*–16*d* are stored in status register 31 for the CardBus controlling software (not shown) to read.

Additionally, multiple sets of SGB pins, SGB_0–SGB_3, for facilitating the exchanges of SGB_0–SGB_3 of PCMCIA cards 16*a*–16*d*, and multiple pairs of new address/data control pins for providing address/data control signals for pin groups 24' and 26' for controlling the transfers of SGC_0–SGC_3 and SGD_0–SGD_3 of PCMCIA cards 16*a*–16*d* are provided.

External buffering circuitry 13 includes a PLD 30, a number of buffers 28–28*c*, and preferably a number of drivers 29. PLD 30 is used to provide the redefined STAT_CHANGED' signal to CardBus adapter 12' responsive to SGA_0–SGA_3 and SC_0–SC_3 of PCMCIA cards 16*a*–16*d*. Buffers 28*a* are used to stage and provide the SGA_0–SGA_3 and SC_0–SC_3 of PCMCIA cards 16*a*–16*d*, responsive to the SGA & SC EN# signal, whereas buffers 28*b*–28*c* are used to stage and facilitate transfers of SGC_0–SGC_3 and SGD_0–SGD_3 with PCMCIA cards 16*a*–16*d*. Drivers 29 are used to electrically facilitate exchanges of SGB_0–SGB_3 with PCMCIA cards 16*a*–16*d*, thereby making it electrically feasible to couple PCMCIA cards 16*a*–16*d* to buffering circuitry 13 by way of cables.

Figure 3A:
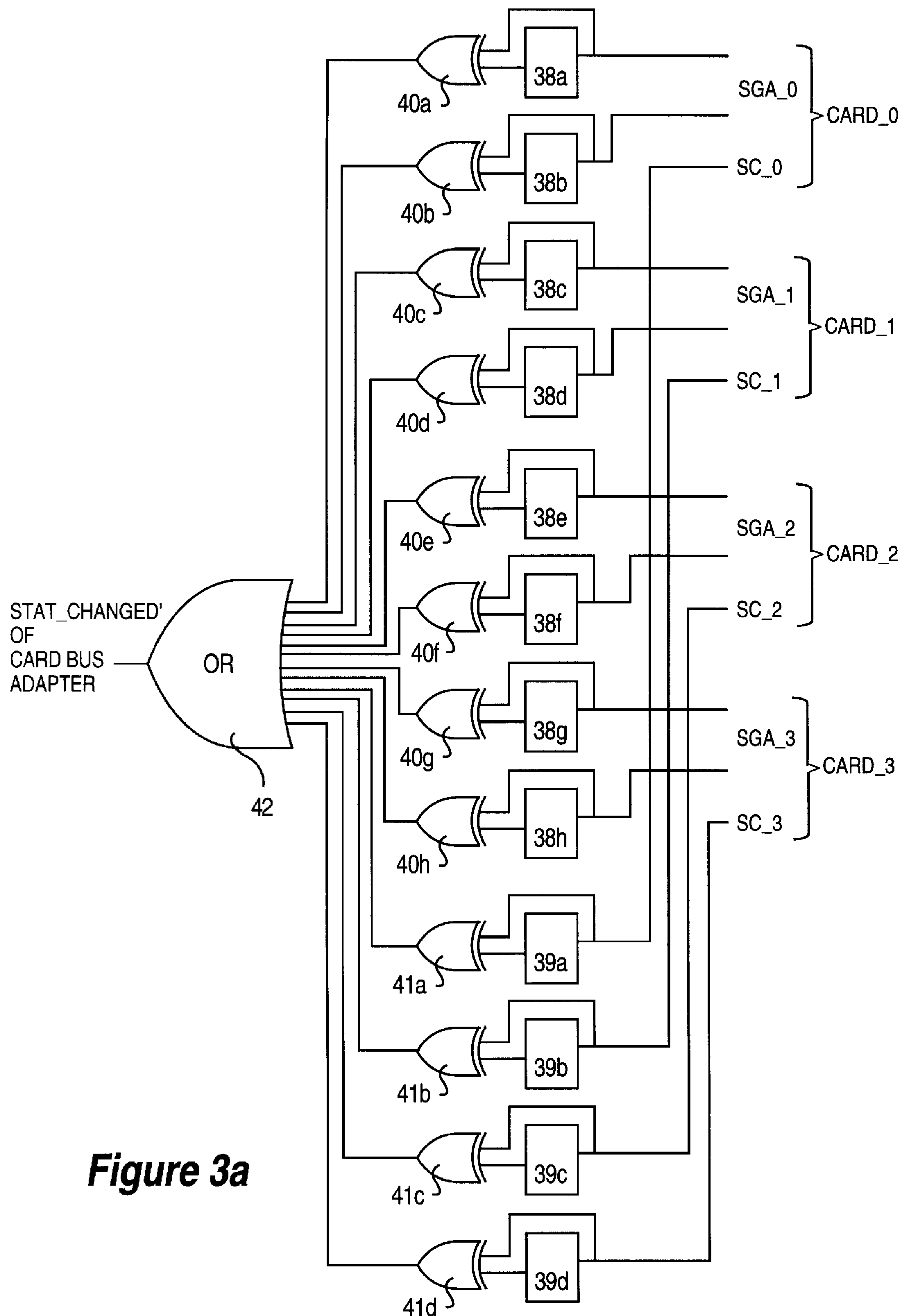
FIGS. 3*a*–3*e* illustrate the drivers, the PLD, and the buffers of FIG. 2 in further detail.

FIGS. 3*a*–3*e* illustrate PLD 30, drivers 29, and buffers 28*a*–28*c* in further detail. As shown in FIG. 3*a*, PLD 30 comprises latches 38*a*–38*h* and 39*a*–39*d*, XOR gates 40*a*–40*h* and 41*a*–41*d*, and OR gate 42, coupled to each other as shown. Latches 38*a*–8H and 39*a*–39*d* correspondingly receive and store SGA_0 SGA_3 and SC_0–SC_3. XOR gates 40*a*–40*h* and 41*a*–41*d* correspondingly "compare" the current and previous states of SGA_0–SGA_3 and SC_0–SC_3, and coupling one or more logical one inputs to OR gate 42 whenever at least one of SGA_0–SGA_3 or SC_0–SC_3 changes. Thus, OR gate 42 couples a logical one input as STAT_CHANGED' whenever the status of one of the interfacing PCMCIA cards 16*a*–16*d* changes, including insertion or removal of the PCMCIA card 16*a*, 16*b*, 16*c* or 16*d*.

Figure 3B:
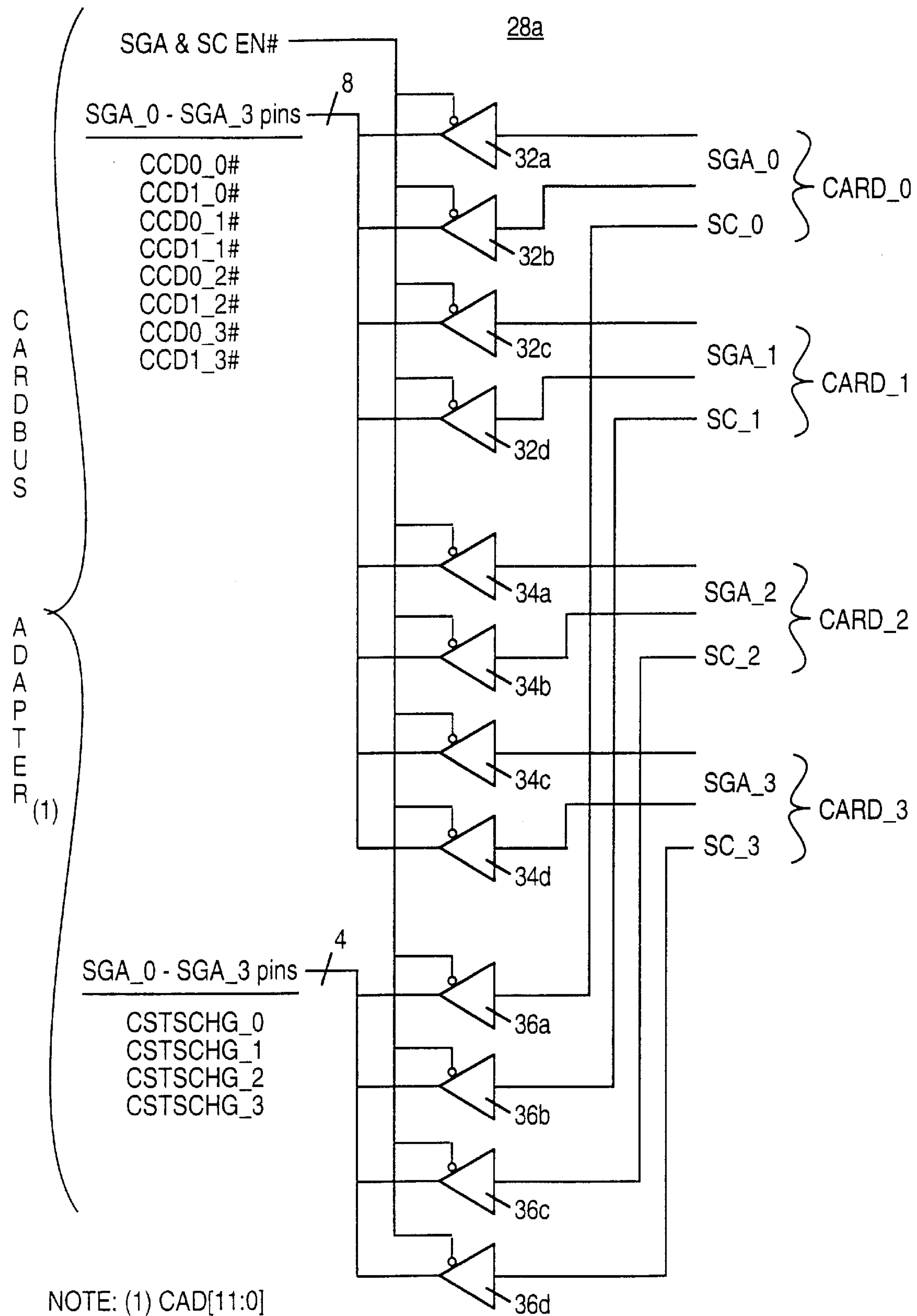

As shown in FIG. 3*b*, buffers 28*a* comprise buffers 32*a*–32*d*, 34*a*–34*d* and 36*a*–36*d* corresponding to CardBus/16-bit PC Cards 16*a*–16*d*. Buffers 32*a*–32*b*, 32*c*–32*d*, 34*a*–34*b* and 34*c*–34*d* couple SGA_0–SGA_3 to CardBus adapter 12' respectively, responsive to SGA & SC EN#. Buffers 36*a*–36*d* couple SC_1–SC_3 to CardBus adapter 12' respectively, responsive to SGA & SC EN#. As described earlier, SGA_0–SGA_3 and SC_1 and SC_3 are coupled to CardBus adapter 12' using a subset of SGC pins 24', in one embodiment, CAD[11:0]. In other words, for the illustrated 1:4 embodiment 10', not only additional pins are not employed to detect insertion/removal and status change of the multiple CardBus/16-bit PC Cards 16*a*–16*d*, a net saving of 1 pin is actually realized.

Figure 3C:
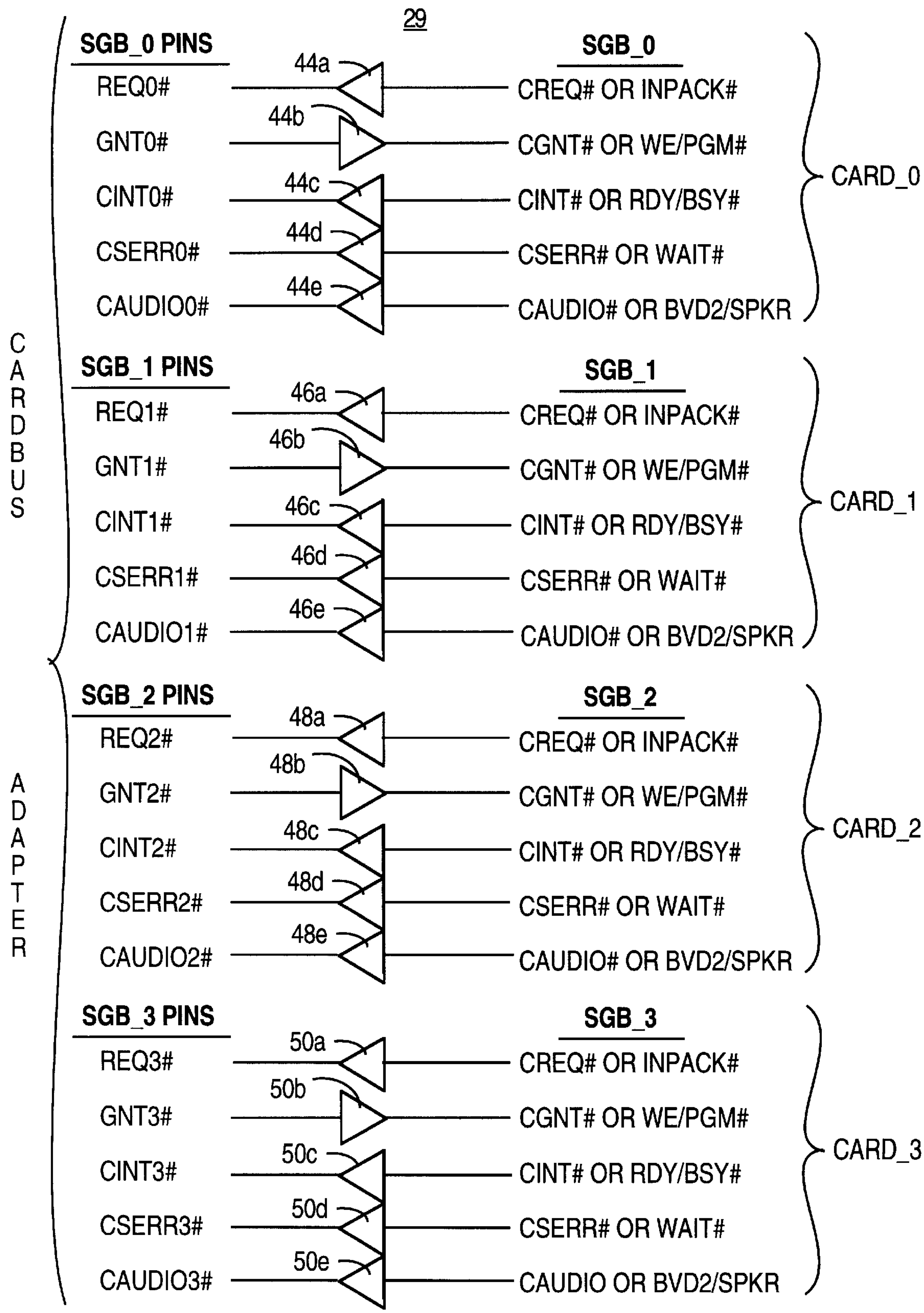

As shown in FIG. 3*c*, drivers 29 comprise drivers 44*a*–44*e*, 46*a*–46*e*, 48*a*–48*e*, and 50*a*–50*e*. Drivers 44*a*–44*e*, 46*a*–46*e*, 48*a*–48*e*, and 50*a*–50*e* electrically isolate CardBus/16-bit PC Cards 16*a*–16*d*, and correspondingly facilitate exchanges of SGB_0–SGB_3. In other words, for the illustrated 1:4 embodiment 10', 15 additional pins are employed to facilitate exchanges of SGB with CardBus/16-bit PC Cards 16*a*–16*d*.

Figure 3D:
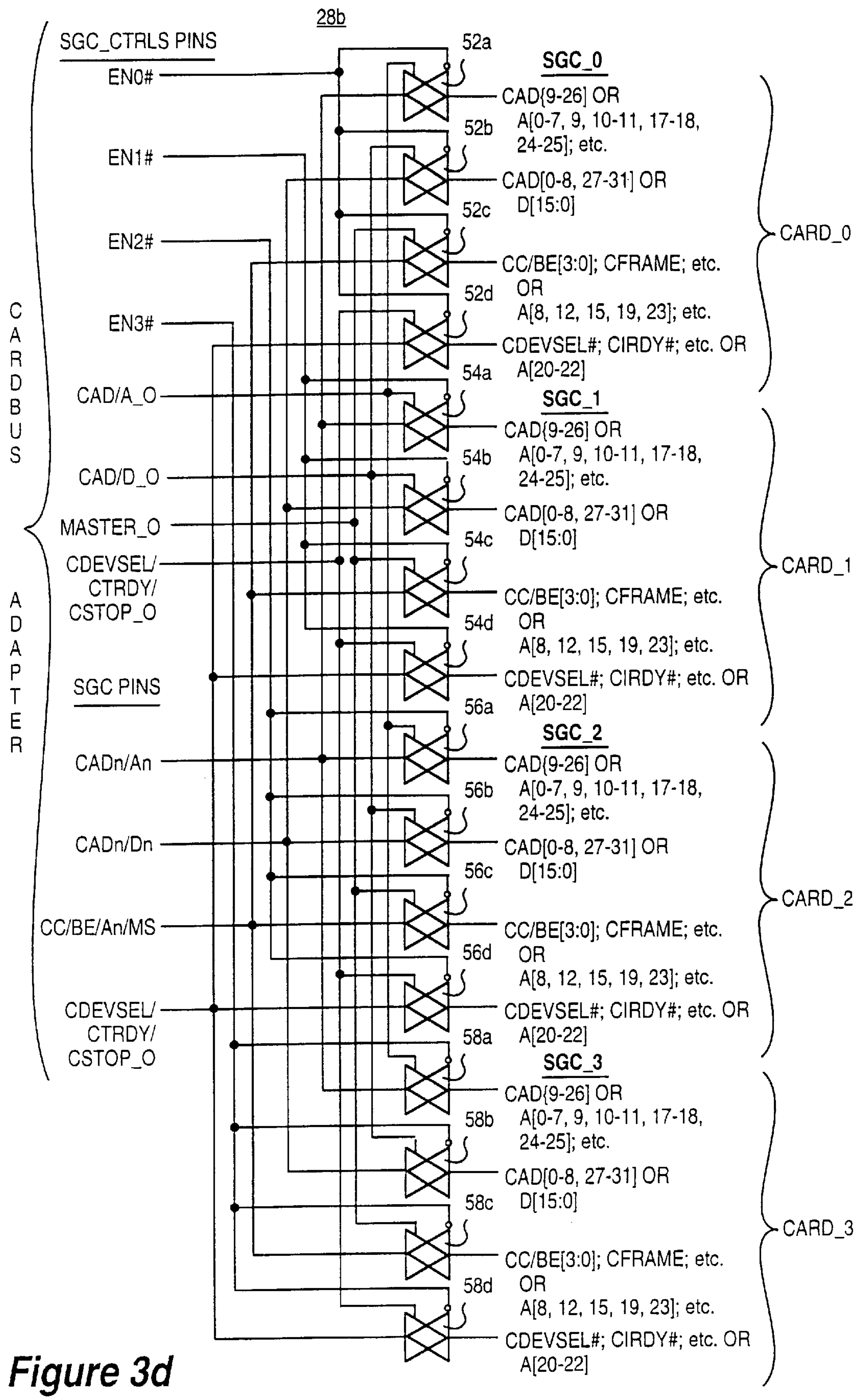

As shown in FIG. 3*d*, buffers 28*b* comprise buffers 52*a*–52*d*, 54*a*–54*d*, 56*a*–56*d*, and 58*a*–58*d* corresponding to CardBus/16-bit PC Cards 16*a*–16*d*. Buffers 52*a*–32*d*, 54*a*–54*d*, 56*a*–56*d*, and 58*a*–58*d* couple one group of SGC_0–SGC_3 to/from CardBus adapter 12', responsive to corresponding SGC enable control signals, ENO#, EN1#, EN2# and EN3#. Only one of ENO#, EN1#, EN2# and EN3# is set to enable by CardBus controlling software at any point in time. In other words, for the illustrated 1:4 embodiment 10', no additional pins are required to facilitate transfers of SGC with the multiple CardBus/16-bit PC Cards 16*a*–16*d*.

Figure 3E:
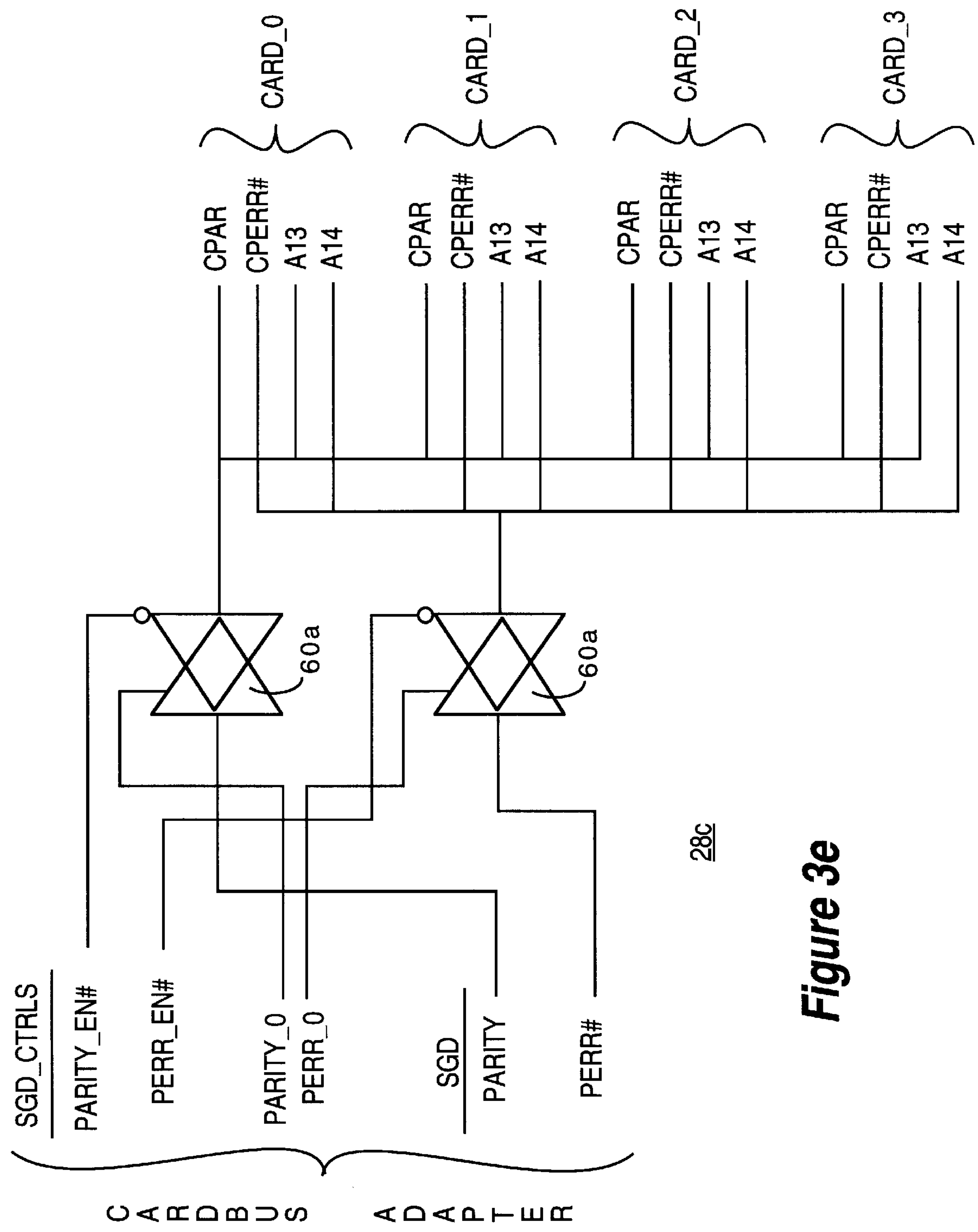

As shown in FIG. 3*e*, buffers 28*c* comprise buffers 60*a*–60*b* common to CardBus/16-bit PC Cards 16*a*–16*d*. Buffers 60*a*–60*b* couple SGD from CardBus adapter 12', responsive to SGD enable control signals, Parity_EN#, PERR_EN#, Parity_O and PERR_0. In other words, for the illustrated 1:4 embodiment 10', not only no additional pins are required to facilitate transfers of SGD to the multiple CardBus/16-bit PC Cards 16*a*–16*d*, a net saving of 2 pins is achieved.

In sum, under the present invention, for the illustrated 1:4 embodiment 10', a net increase of only 12 pins are required to concurrently interface to the multiple CardBus/16-bit PC Cards 16*a*–16*d*. As will be appreciated by those skilled in the art, the illustrated 1:4 embodiment may be implemented using a typical 208 pin ASIC, resulting in substantial savings in ASICs and motherboard real estate.

Figure 4:
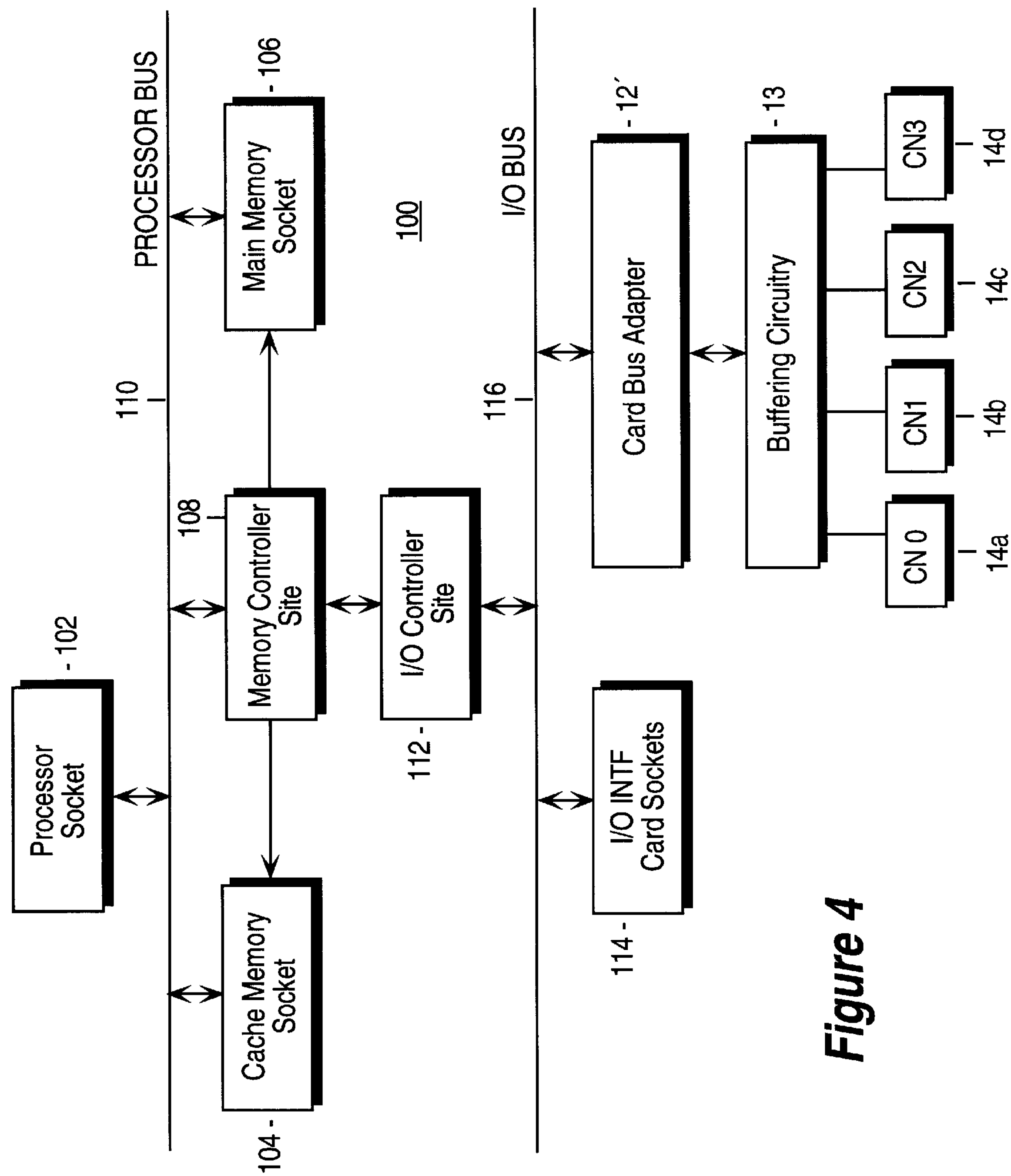
FIG. 4 illustrates a motherboard incorporating the teachings of the present invention.

Referring now to FIG. 4, a block diagram illustrating an exemplary motherboard incorporating the teachings of present invention is shown. CardBus adapter 12' including associated buffering circuitry 13 and connectors 14*a*–14*d* are coupled to I/O bus 116 of exemplary motherboard 100. I/O bus 116 in turn is electrically coupled to I/O controller site 112 suitable for mounting of an I/O controller, and I/O interface card sockets 114 suitable for receiving I/O interface cards.

I/O controller site 112 in turn is electrically coupled to memory controller site 108 suitable for mounting of a memory controller. Memory controller site 108 is also electrically coupled to main memory socket 106, cache memory socket 104 and processor bus 110. Main and cache memory sockets 106 and 104 are suitable for receiving main and cache memory modules. Lastly, processor bus 110 is also coupled to processor socket 102 suitable for receiving a processor.

Figure 5:
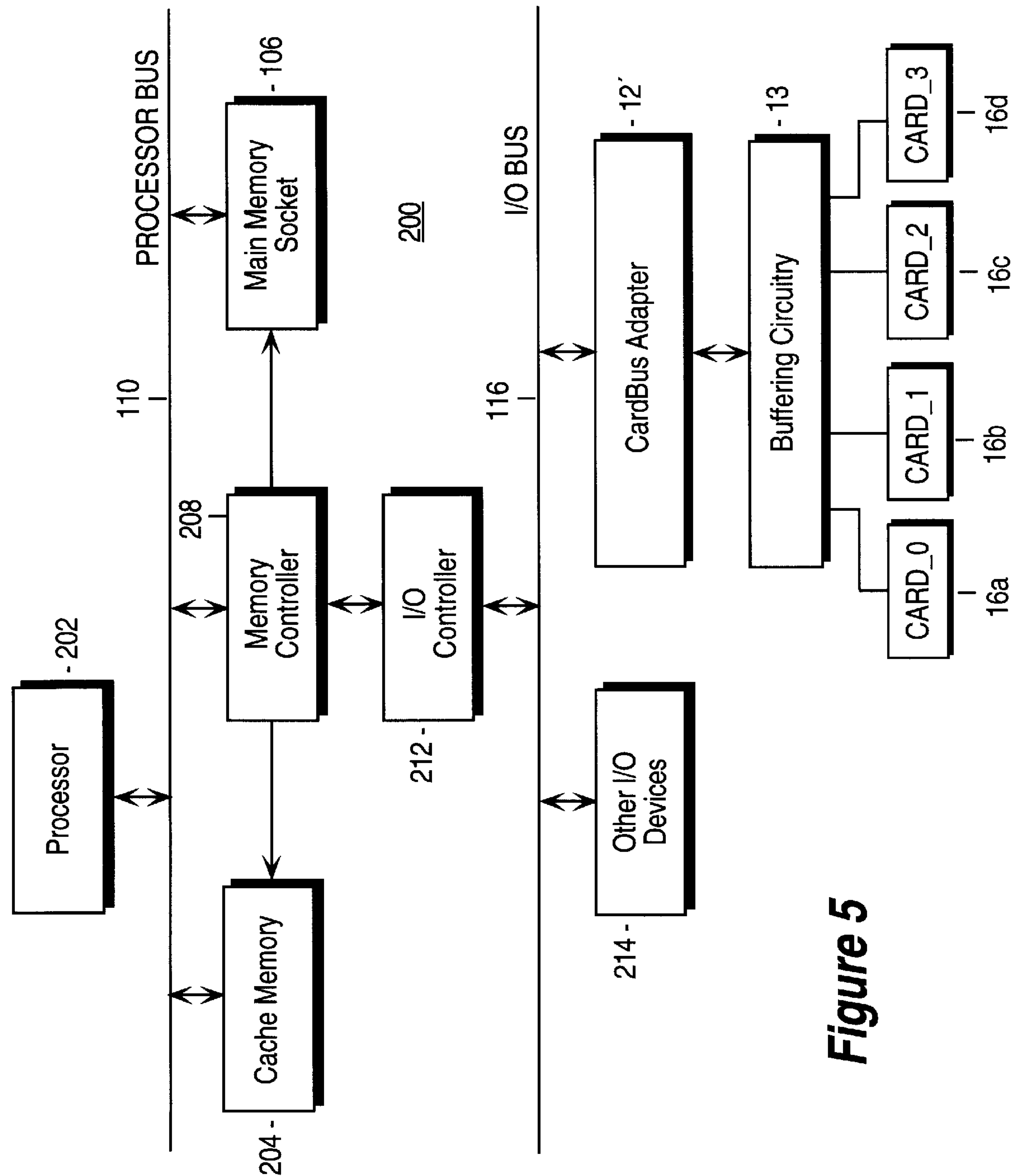
FIG. 5 illustrates a computer system incorporating the teachings of the present invention.

Referring now to FIG. 5, a block diagram illustrating an exemplary computer system incorporating the teachings of present invention is shown. CardBus adapter 12', including the associated buffering circuitry 13 and CardBus/16-bit PC Cards 16*a*–16*d* (connectors 14*a*–14*d* not shown) are coupled to I/O bus 116 of the I/O subsystem of exemplary computer system 200. I/O bus 116 in turn is coupled to I/O controller 212 and I/O devices 214 of the I/O subsystem.

I/O controller 212 in turn is coupled to memory controller 208 of the memory subsystem of exemplary computer system 200. Memory controller 208 is also coupled to main memory 206, cache memory 204 and processor bus 110 of the memory subsystem. Lastly, processor bus 110 is coupled to processor 202.

Thus, an enhanced CardBus adapter and associated buffering circuitry for interfacing multiple CardBus/16-bit PC cards have been described. While the apparatus of the present invention have been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An enhanced CardBus adapter comprising:

a) a single status pin for receiving a consolidated status change control signal that, when set, denotes a status change for one of a plurality of interfacing PCMCIA cards;

b) a status control pin for outputting a status enabling signal for enabling reading of externally buffered individual card presence and status change control signals of the plurality of interfacing PCMCIA cards;

c) a plurality of address/data pins for transfer addresses/data to and from the plurality of interfacing PCMCIA cards, wherein some of the address/data pins are selectively used for receiving the externally buffered individual card presence and status change control signals of the plurality of interfacing PCMCIA cards;

d) multiple sets of transactional pins, one set for each interfacing PCMCIA card, for correspondingly exchanging transactional signals with the interfacing PCMCIA cards through a plurality of external drivers; and e) a status register, coupled to the address/data pins that are also used for receiving the externally buffered individual card presence and status change control signals of the interfacing PCMCIA cards being read, for storing the received individual card presence and status change control signals of the intefacing PCMCIA cards.

2. The enhanced CardBus adapter as set forth in claim 1, wherein the enhanced CardBus adapter further comprises:

f) multiple pairs of address/data control pins for outputting address/data control signals for controlling selective transfers of address/data signals to and from one of the interfacing PCMCIA cards.

3. The enhanced CardBus adapter as set forth in claim 1, wherein the enhanced CardBus adapter further comprises:

d) multiple sets of transactional pins, one set for each interfacing PCMCIA card, for correspondingly exchanging transactional signals with the interfacing PCMCIA cards.

4. The enhanced CardBus adapter as set forth in claim 1, wherein the enhanced CardBus adapter further comprises:

d) multiple pairs of address/data control pins for outputting address/data control signals for controlling selective transfers of address/data signals to and from one of the interfacing PCMCIA cards.

5. An apparatus for interfacing multiple PCMCIA cards at the same time, the apparatus comprising:

a) an enhanced CardBus adapter having a.1) a single status pin for receiving a consolidated status change control signal that, when set, denotes status change for one of a plurality of interfacing PCMCIA cards, a.2) a status control pin for outputting a status enabling signal for enabling reading of externally buffered individual card presence and status change control signals of the plurality of interfacing PCMCIA cards, a.3) a plurality of address/data pins for transferring addresses/data to and from the plurality of interfacing PCMCIA cards, wherein some of the address/data pins are also used for receiving the externally buffered individual card presence and status change control signals of the plurality of interfacing PCMCIA cards being read; and b) associated buffering circuitry for the enhanced CardBus adapter including b.1) a PLD for generating the consolidated status change signal responsive to the individual card presence and status change control signals of the plurality of interfacing PCMCIA cards, and b.2) a first plurality of buffers for buffering and providing the individual card presence and status change control signals of the plurality of interfacing PCMCIA cards responsive to the status enabling signal.

6. The apparatus as set forth in claim 5, wherein, the enhanced CardBus adapter also has a.4) a status register coupled to the address/data pins that are also used for receiving the externally buffered individual card presence and status change control signals of the interfacing PCMCIA cards being read, for storing the received individual card presence and status change control signals of the interfacing PCMCIA cards.

7. The apparatus as set forth in claim 5, wherein, the enhanced CardBus adapter also has a.4) multiple sets of transactional pins, one set for each interfacing PCMCIA card, for correspondingly exchanging transactional signals with the interfacing PCMCIA cards.

8. The apparatus as set forth in claim 7, wherein, the associated buffering circuitry further includes b.3) a plurality of drivers for electrically driving the transactional signals to and from the interfacing PCMCIA cards.

9. The apparatus as set forth in claim 5, wherein, the enhanced CardBus adapter also has a.4) multiple pairs of address/data control pins for outputting address/data control signals for controlling selective transfers of address/data signals to and from one of the interfacing PCMCIA cards; and the associated buffering circuitry further includes b.3) a second plurality of buffers for buffering the address/data signals of the interfacing PCMCIA cards.

10. The apparatus as set forth in claim 9, wherein, the second plurality of buffers comprise a first group of buffers organized into multiple sets for correspondingly buffering a first subset of the address/data signals of the various interfacing PCMCIA cards, and a second group of buffers organized as a single set for buffering a second subset of the address/data signals of all interfacing PCMCIA cards.

11. A method for simultaneously interfacing a plurality of PCMCIA cards to a single CardBus adapter at the same time, the method comprising the steps of:

a) externally generating a consolidated status change control signal for the CardBus adapter to denote status change for one of the plurality of interfacing PCMCIA cards;

b) externally buffering individual card presence and status change control signals of the plurality of interfacing PCMCIA cards;

c) generating a status enabling signal by the CardBus adapter to enable reading of the buffered individual card presence and status change control signals of the plurality of interfacing PCMCIA cards; and d) reading the buffered individual card presence and status change control signals of the plurality of interfacing PCMCIA cards by the CardBus adapter through a subset of a plurality of address/data pins of the CardBus adapter normally used for transferring addresses/data to and from the plurality of interfacing PCMCIA cards; and e) exchanging transaction signals with the interfacing PCMCIA cards using multiple sets of corresponding transactional pins disposed on the CardBus adapter with external drivers.

12. The method as set forth in claim 11, wherein the method further comprises the step of:

e) receiving and storing the individual card presence and status change control signals of the interfacing PCMCIA cards by the CardBus adapter in a status register of the CardBus adapter.

13. The method as set forth in claim 11, wherein step (e) further comprises driving the transactional signals to and from the interfacing PCMCIA cards with a plurality of drivers external to the CardBus adapter.

14. The method as set forth in claim 11, wherein the method further comprises:

e) externally buffering address/data signals being transferred to and from the interfacing PCMCIA cards; and f) generating address/data control signals for controlling selective transfers of address/data signals to and from one of the interfacing PCMCIA cards through the address/data pins of the CardBus adapter.

15. A motherboard of a computer system, the motherboard comprising a) an I/O bus for transferring I/O signals;

b) an enhanced CardBus adapter, coupled to the I/O bus, the enhanced CardBus adapter comprising:

b.1) a status pin for receiving a consolidated status change control signal that, when set, denotes status change for one of a plurality of interfacing PCMCIA cards, b.2) a status control pin for outputting a status enabling signal for enabling reading of externally buffered individual card presence and status change control signals of the plurality of interfacing PCMCIA cards, b.3) a plurality of address/data pins for transferring addresses/data to and from the plurality of interfacing PCMCIA cards, wherein some of the address/data pins are also used for receiving the externally buffered individual card presence and status change control signals of the plurality of interfacing PCMCIA cards being read;

c) associated buffering circuitry for the enhanced CardBus adapter including c.1) a programmable logic device (PLD) for generating the consolidated status change signal responsive to the individual card presence and status change control signals of the plurality of interfacing PCMCIA cards, c.2) a first plurality of buffers for buffering and providing the individual card presence and status chance control signals of the plurality of interfacing PCMCIA cards responsive to the status enabling signal; and d) a plurality of connectors coupled to the buffering circuitry for removably receiving the plurality of interfacing PCMCIA cards.

16. The motherboard as set forth in claim 15, wherein, the enhanced CardBus adapter also has b.4) a status register coupled to the address/data pins that are also used for receiving the externally buffered individual card presence and status change control signals of the interfacing PCMCIA cards being read, for storing the received individual card presence and status change control signals of the interfacing PCMCIA cards.

17. The motherboard as set forth in claim 15, wherein, the enhanced CardBus adapter also has b.4) multiple sets of transactional pins, one set for each interfacing PCMCIA card, for correspondingly exchanging transactional signals with the interfacing PCMCIA cards.

18. The motherboard as set forth in claim 17, wherein, the associated buffering circuitry further includes c.3) a plurality of drivers for electrically driving the transactional signals to and from the interfacing PCMCIA cards.

19. The motherboard as set forth in claim 18, wherein, the enhanced CardBus adapter also has b.4) multiple pairs of address/data control pins for outputting address/data control signals for controlling selective transfers of address/data signals to and from one of the interfacing PCMCIA cards; and the associated buffering circuitry further includes c.3) a second plurality of buffers for buffering the address/data signals of the interfacing PCMCIA cards.

20. A computer system comprising:

a) a processor for executing instructions;

b) a memory subsystem coupled to the processor for storing the instructions and data; and c) an I/O subsystem coupled to the processor and memory subsystem including c.1) an enhanced CardBus adapter having c.1.1) a status pin for receiving a consolidated status change control signal, when set, denoting status change for one of a plurality interfacing PCMCIA cards, c.1.2) a status control pin for providing a status enabling signal for enabling reading of externally buffered individual card presence and status change control signals of the interfacing PCMCIA cards, c.1.3) a plurality of address/data pins for transferring addresses/data to and from the interfacing PCMCIA cards, wherein some of the address/data pins are also used for receiving the externally buffered individual card presence and status change control signals of the interfacing PCMCIA cards being read;

c.2) associated buffering circuitry for the enhanced CardBus adapter including c.2.1) a PLD for generating the consolidated status change signal responsive to the individual card presence and status change control signals of the interfacing PCMCIA cards, c.2.2) a first plurality of buffers for buffering and providing the individual card presence and status change control signals of the interfacing PCMCIA cards responsive to the status enabling signal;

c.3) a plurality of connectors coupled to the buffering circuitry for removably receiving the PCMCIA cards.

21. The computer system as set forth in claim 20, wherein, the enhanced CardBus adapter also has c.1.4) a status register coupled to the address/data pins that are also used for receiving the externally buffered individual card presence and status change control signals of the interfacing PCMCIA cards being read, for storing the received individual card presence and status change control signals of the interfacing PCMCIA cards.

22. The computer system as set forth in claim 20, wherein, the enhanced CardBus adapter also has c.1.4) multiple sets of transactional pins, one set for each interfacing PCMCIA card, for correspondingly exchanging transactional signals with the interfacing PCMCIA cards.

23. The computer system as set forth in claim 22, wherein, the associated buffering circuitry further includes c.2.3) a plurality of drivers for electrically driving the transactional signals to and from the interfacing PCMCIA cards.

24. The computer system as set forth in claim 20, wherein, the enhanced CardBus adapter also has c.1.4) multiple pairs of address/data control pins for outputting address/data control signals for controlling selective transfers of address/data signals to and from one of the interfacing PCMCIA cards; and the associated buffering circuitry further includes c.2.3) a second plurality of buffers for buffering the address/data signals of the interfacing PCMCIA cards.

* * * * *